(12) United States Patent
Vogler et al.

(10) Patent No.: US 8,420,215 B2
(45) Date of Patent: Apr. 16, 2013

(54) CYCLIC PROCESS FOR THE PREPARATION OF BARIUM SULPHATE AND LITHIUM METAL PHOSPHATE COMPOUNDS

(75) Inventors: Christian Vogler, Moosburg (DE); Klaus Langer, Munich (DE); Andreas Pollner, Moosburg (DE); Gerhard Nuspl, Munich (DE)

(73) Assignee: Sued-Chemie IP GmbH & Co. KG, Munich (DE)

( * ) Notice: Subject to any disclaimer, the term of this patent is extended or adjusted under 35 U.S.C. 154(b) by 398 days.

(21) Appl. No.: 12/668,562

(22) PCT Filed: Jul. 14, 2008

(86) PCT No.: PCT/EP2008/005738
§ 371 (c)(1),
(2), (4) Date: Jun. 14, 2010

(87) PCT Pub. No.: WO2009/010263
PCT Pub. Date: Jan. 22, 2009

(65) Prior Publication Data
US 2010/0255308 A1    Oct. 7, 2010

(30) Foreign Application Priority Data
Jul. 18, 2007    (DE) .......................... 10 2007 033 460

(51) Int. Cl.
*B32B 5/16*    (2006.01)
(52) U.S. Cl.
USPC ........... 428/402; 423/299; 423/179; 423/551; 423/554
(58) Field of Classification Search .................. 428/402; 423/179, 299, 551, 554
See application file for complete search history.

(56) References Cited

U.S. PATENT DOCUMENTS

| | | | |
|---|---|---|---|
| 5,910,382 A | 6/1999 | Goodenough et al. | |
| 7,501,110 B2 | 3/2009 | Amirzadeh-Asl et al. | |
| 7,998,618 B2 * | 8/2011 | Nuspl et al. | 429/218.1 |
| 8,168,150 B2 * | 5/2012 | Hemmer et al. | 423/306 |
| 2003/0124048 A1 | 7/2003 | Hardinghaus et al. | |
| 2003/0159622 A1 | 8/2003 | Arnizadeh-Asl et al. | |
| 2003/0228251 A1 * | 12/2003 | Boryta et al. | 423/499.3 |
| 2004/0151649 A1 | 8/2004 | Hemmer et al. | |
| 2004/0167251 A1 | 8/2004 | Amirzadeh-Asl et al. | |
| 2007/0054187 A1 | 3/2007 | Nuspl et al. | |
| 2008/0268149 A1 | 10/2008 | Amirzadeh-Asl et al. | |

FOREIGN PATENT DOCUMENTS

| | | |
|---|---|---|
| DE | 41 30 409 A1 | 3/1993 |
| DE | 199 26 216 A1 | 2/2001 |
| DE | 103 53 266 A1 | 6/2005 |
| EP | 0 613 862 A2 | 9/1994 |
| EP | 1 375 427 A1 | 1/2004 |
| EP | 1375427  * | 1/2004 |
| JP | 1-135319 | 5/1989 |
| JP | 7-277729 | 10/1995 |
| JP | 7-286279 | 10/1995 |
| WO | WO 00/76919 A1 | 12/2000 |
| WO | WO 01/58809 A2 | 8/2001 |
| WO | WO 01/92157 A1 | 12/2001 |
| WO | WO 02/083555 A2 | 10/2002 |
| WO | WO 02/099913 A1 | 12/2002 |

OTHER PUBLICATIONS

J. Hocken, "Blanc Fixe: More Than an Extender," *Euro Coat*, Lyon, 1997, pp. 1-14.
E. Machunsky & J. Winkler, "The effect of fine and ultrafine banium sulphate powders on the properties of coatings," *Polymers Paint Colour Journal*, vol. 180, 1990, pp. 350-354.
International Search Report of PCT/EP2008/005738, dated Jan. 21, 2009.

* cited by examiner

*Primary Examiner* — Leszek Kiliman
(74) *Attorney, Agent, or Firm* — RatnerPrestia

(57) ABSTRACT

A cyclic process for the preparation of barium sulphate and lithium-iron phosphate comprising (i) preparing an aqueous solution containing lithium and sulphate ions and (ii) adding solid barium hydroxide at a temperature of more than 50° C., wherein the barium hydroxide is added over a period of less than 15 minutes. Also, barium sulphate obtainable by the process according to the invention.

16 Claims, 2 Drawing Sheets

CYCLIC PROCESS FOR THE PREPARATION OF BARIUM SULPHATE AND LITHIUM METAL PHOSPHATE COMPOUNDS

CROSS REFERENCE TO RELATED APPLICATIONS

This is a National Phase application of PCT application number PCT/EP2008/005738, filed Jul. 14, 2008, which claims priority benefit of German application number DE 10 2007 033 460.7, filed Jul. 18, 2007, the content of such applications being incorporated herein by reference.

FIELD OF THE INVENTION

The present invention relates to a process for the preparation of barium sulphate and lithium metal phosphates.

BACKGROUND OF THE INVENTION

Both barium sulphate and lithium metal phosphates are of great industrial importance:

Barium sulphate is used in particular for the preparation of photographic papers, varnishes and plastics and also in medical diagnostics and in medical plastics. Barium sulphate is a high-quality, pure-white inert, acid- and alkali-resistant filler which is extremely weatherproof.

Barium sulphate with a high so-called "brightness", with a small specific surface and a low oil absorption number as well as good dispersibility is called "blanc fixe" and serves as white pigment and filler.

Particularly high-quality and finely dispersed "blanc fixe" types are also used in particular in cosmetics and sunscreens (WO 01/92157). Further details on "blanc fixe" are discussed for example by J. Hocken in Euro Coat, Lyon September 1997, pages 1 to 14.

Due to its high absorption for X-radiation and its high biological inertia, it also serves as a medical contrast medium.

Blanc fixe types with an average particle size of 0.5 to 1 µm and narrow grain-size spread, i.e. in particular with a monomodal particle-size distribution, have maximum light scatter effect and are therefore particularly suitable as white pigment or substitute for titanium white. (Machunsky, E. Winkler, J., Polymers Paint Colour Journal (1990) 180, 350-354).

Blanc fixe is usually prepared on an industrial scale by reacting caustic soda solution and sulphuric acid or sodium sulphate solutions with aqueous solutions of barium chloride or barium sulphide. The particle morphology is set by adjusting the reaction conditions such as temperature, concentration, pH, mixing and stirring speeds, addition of seed crystals or also organic additives.

In particular, organic additives have recently come into use to improve the particle morphology of barium sulphate (WO 01/58809).

There are strict requirements in respect of the purity of the starting solutions when preparing "blanc fixe", in particular in respect of the presence of metals (e.g. transition metals and heavy metals) influencing the brightness, in order to obtain products with a high brightness.

According to WO 00/76919, barium sulphate can also be prepared from dissolved barium hydroxide with sulphuric acid, which, in addition to high raw material costs, is also economically unappealing due to the poor solubility of barium hydroxide.

More recently, lithium metal phosphate compounds, in particular lithium transition-metal phosphate compounds, have been widely used as cathode and anode materials in batteries (U.S. Pat. No. 5,910,382, WO 02/099913).

In addition to solid-state syntheses, wet-chemical processes for the preparation of such compounds are also used, as described for example in DE-10353266 or in WO02/083555. In such wet-chemical processes, the particle morphology of the produced lithium transition-metal phosphate can advantageously be particularly well controlled. Often in these processes i.a. lithium hydroxide is used as raw material, combined in one of the synthesis steps with an acid solution containing phosphoric acid and at least one transition-metal sulphate. However, the problem when preparing lithium transition-metal phosphates according to such wet-chemical processes was in particular the high loss of lithium ions in the so-called waste lye, the reuse of which in typical industrial cyclic processes, in particular in the working-up and recovery of the starting substances, is made difficult by high levels of foreign ions, in particular sulphate.

To date, only extremely laborious purification processes were known in order to make a reconstitution of the lithium-containing waste lye possible.

DESCRIPTION OF THE INVENTION

The object of the present invention was therefore to create a process which allows an economical and efficient re-use and working-up of waste waters containing lithium and sulphate ions.

This object is achieved by a process which provides a cyclic process for the preparation of barium sulphate and lithium transition-metal phosphates, comprising the steps of
(i) preparing an aqueous solution containing lithium and sulphate ions and
(ii) adding solid barium hydroxide at a temperature of more than 50° C.
(iii) wherein the barium hydroxide is added over a period of less than 15 minutes.

It was surprisingly found that an almost complete recovery of the valuable lithium component is possible compared with precipitation techniques known to date which allow only an incomplete recovery as there are simply no poorly soluble lithium compounds. In addition, surprisingly a phase-pure barium sulphate of high brightness and uniform fine-grained particle morphology precipitates which satisfies the strict requirements for a "blanc fixe" quality.

In particular, the thus-obtained barium sulphate has the particle-size distribution required for "blanc fixe" and a low specific surface, without the need for crystallization auxiliaries such as seed crystals or the addition of organic additives. This result of the process according to the invention was unexpected in this form. As a person skilled in the art knows, the very low solubility product of barium sulphate during the precipitation reaction normally results in very high supersaturations and nucleation rates, which in turn result in extremely high-surface and strongly agglomerated precipitation products with a high specific surface.

The precipitated barium sulphate can be used economically as white pigment. The solid precipitation product is separated from the mother liquor for example by filtration or centrifuging or other methods which appear suitable to a person skilled in the art and optionally washed, wherein a concentrated lithium hydroxide solution forms as mother liquor which can then be re-used in the subsequent wet-chemical synthesis of lithium transition-metal phosphates.

Compared with the barium hydroxide solutions used in the state of the art, the addition of solid barium hydroxide has the advantage that the lithium hydroxide solution obtained through the precipitation of the barium sulphate is not unnecessarily diluted, with the result that as a rule no additional energy-consuming concentration of the lithium hydroxide solution is necessary before it is re-used.

It is advantageous in particular with the process according to the invention that no further alkali ions are contained in the mother liquor or in the precipitation product which would contaminate the lithium salt solution or the barium sulphate.

The diluted washing solution, which is optionally obtained in the process according to the invention when washing the separated barium sulphate, is free from interfering foreign ions and can likewise be re-added to the mother liquor, e.g. after an additional concentration step.

The process according to the invention thereby makes possible an almost complete recovery of lithium or lithium ions, which is not possible with other processes known from the state of the art.

The barium sulphate obtained in the process according to the invention is particularly phase-pure and almost free of interfering iron ions which cause a yellow colouring, and can be used directly as "blanc fixe" quality.

The solid barium hydroxide is added according to the invention at a temperature of more than 50° C., particularly preferably above 75-80° C. Below 50° C., typically no particle morphologies and distributions of the barium sulphate are obtained which make a use as "blanc fixe" possible.

It is furthermore important that the addition of the barium hydroxide is completed in less than 15 minutes, preferably in less than 5 minutes, even more preferably within one minute, in order that the precipitation takes place quickly, which also positively influences the desired particle morphology.

If addition lasts more than 15 minutes, bi- and polymodal particle distributions are observed which did not disappear even when the temperature was increased.

During the addition of the barium hydroxide and at least up to the conclusion of the precipitation reaction, the mixture is stirred in order to prevent a sedimentation of the barium hydroxide used or of the precipitation product.

The barium sulphate that can be obtained by means of the process according to the invention has a very high brightness of greater than 95, preferably greater than 97 and particularly preferably greater than 99, as well as a low specific surface of less than 15 $m^2/g$, quite particularly preferably less than 10 $m^2/g$.

The obtained barium sulphate is preferably alkali-free and also chloride- and sulphide-free, with the result that the purity of the barium sulphate obtained by means of the process according to the invention is particularly high.

In quite particularly preferred embodiments of the invention, the obtained barium sulphate has a particle size in the range of 0.5 to 1 μm, wherein the particle distribution is particularly preferably monomodal and the $D_{50}$ value is preferably between 0.4-0.8 μm, quite particularly preferably is 0.6 μm.

Surprisingly it was found that a low-iron barium sulphate with high brightness can be obtained with the process according to the invention, even if the lithium sulphate waste water used as starting solution comes from a preparation process of an iron-containing lithium metal phosphate.

After the precipitation and separation of the barium sulphate, the obtained solution containing lithium hydroxide is returned to a wet-chemical preparation process of lithium-iron phosphate, as is described e.g. in DE 10353266 or in WO02/083555. Naturally, any other lithium transition-metal phosphate can also be prepared in this way. Preferred transition metals, in addition to iron, which are preferably used in the form of their sulphates are Mn, Co, Ni, and V and any combinations thereof. Particularly preferred combinations are those of Fe and Mn, or Co.

The process according to the invention optionally also covers a pre-treatment of the waste water containing lithium sulphate before the precipitation of barium sulphate. For this, the pH of the waste water is adjusted by the addition of lithium hydroxide to a value between 8 and 2, preferably between 7 and 4, in order to reduce the phosphate content by precipitation of lithium phosphate and precipitate any foreign metal ions as hydroxides. The precipitate is separated from the mother liquor containing lithium sulphate for example by filtration, centrifuging or other methods which seem suitable to a person skilled in the art. The basified mother liquor can also be passed to a concentration phase by reverse osmosis. For this, it is preferably re-neutralized (pH 7-8) by the addition of sulphuric acid or slightly acidified (pH 4-6). This very economical process for concentrating solutions is advantageously carried out with neutral or slightly acid solutions and is therefore also advantageously carried out on the mother liquor containing lithium sulphate before the barium sulphate precipitation and not on the basic lithium hydroxide solution after the barium sulphate precipitation.

The separated precipitate is disposed of in suitable manner or, in the case of lithium phosphate, re-used as raw material for the preparation of for example lithium transition-metal phosphates. For this, it is preferably converted by acidification, preferably with phosphoric acid, to readily soluble lithium hydrogen phosphate.

As is known to a person skilled in the art, the residual content of sulphate ions or barium ions of the lithium hydroxide solution obtained during the barium sulphate precipitation is determined by the stoichiometric ratio of the barium hydroxide used to the lithium sulphate contained in the solution and by the completeness of the precipitation reaction. This requires an exact monitoring of the contents and the quantities of reactants used. As barium hydroxide can occur in the form of different hydrates with a changing water content and, depending on the degree of aging, with a changing carbonate content, the process according to the invention also provides a simple procedure which the operator can carry out himself to directly monitor the precipitation result.

A sample of the suspension is taken from the reaction vessel after the conclusion of the precipitation reaction and filtered off in a laboratory suction filter on a microfiltration membrane. The filtrate is neutralized with hydrochloric acid and divided between two test tubes A and B. A few drops of a saturated barium chloride solution are added to test tube A, while a few drops of a saturated lithium sulphate solution are added to test tube B. If test tube A displays marked clouding, there is a high residual sulphate content and this must be corrected by adding further barium hydroxide to the reaction vessel. If test tube B displays marked clouding, there is a high residual barium content and this must be corrected by adding further lithium sulphate solution. The process can be carried out repeatedly until both test tubes display no or only slight clouding, and there is a lithium hydroxide solution of good purity. As a rule, a low barium content is preferred and a slight clouding in test tube A more likely to be acceptable.

The completeness of the precipitation reaction can also be checked with the test methods. For this, the filter cake is removed from the filter and agitated again in demineralized water and stirred for at least a further 10 min. This suspension is filtered out again in the previously purified filter and the filtrate checked as above. If test tube B displays clouding, the suspension still contains unreacted solid barium hydroxide and the mixture in the reaction vessel must be stirred further. The mother liquor containing lithium hydroxide thus obtained and checked with a few simple steps can then be used in a process for the preparation of lithium transition-metal phosphates, for example according to DE-10353266 or WO02/083555, by mixing it with an acid solution containing phosphoric acid and at least one transition-metal sulphate.

The process according to the invention thus provides a cyclic process which simultaneously makes possible the preparation of phase-pure barium sulphate and lithium transition-metal phosphates, with the result that a closed waste water system or waste water cycle is obtained which operates in both a particularly environmentally friendly and also particularly economically efficient manner.

BRIEF DESCRIPTION OF THE FIGURES

The invention is described below with reference to some embodiment examples and the diagrams without these being understood as limiting.

There are shown in.

COMPARISON EXAMPLE 1

Precipitation of $BaSO_4$ at Room Temperature

Waste water, containing lithium sulphate, from a wet-chemical preparation process for lithium-iron phosphate according to DE 10353266 is set to a pH of 10 by adding lithium hydroxide, filtered on a paper filter, acidified with sulphuric acid to pH 5 and evaporated in the laboratory flask to a concentration of 148 g/l lithium sulphate. The X-ray diffraction spectrum of the filtered precipitation product shows lithium phosphate. 105 ml of the concentrated lithium sulphate solution is stirred in a 200 ml beaker on a magnetic stirrer with a non-activated heating plate. 26.78 g of fine-powdered industrial-grade barium hydroxide monohydrate is added within 10 sec. A white suspension forms, the viscosity of which rises rapidly initially and then falls again slowly. The suspension is stirred for a further 20 min and filtered off on a paper filter. The filtrate is separated and the filter cake washed with completely desalinated water to a specific conductivity of below 150 μS/cm. The particle-size distribution of the still wet filter cake is measured in a Malvern Mastersizer in ethanol with an ultrasound finger. The measured particle-size distribution is trimodal with $D_{10}$=0.4 μm, $D_{50}$=3.0 μm, $D_{90}$=33 μm. The filter cake is dried overnight at 60° C. and ground on a variable-speed rotor mill (Fritsch Pulverisette 14). The X-ray diffraction spectrum of the dried and ground filter cake showed no phase-pure barium sulphate. The scanning electron microscope micrograph showed aggregated thin-sheet particles in stacks.

COMPARISON EXAMPLE 2

Precipitation of $BaSO_4$ at 40° C.

Figure 1A:
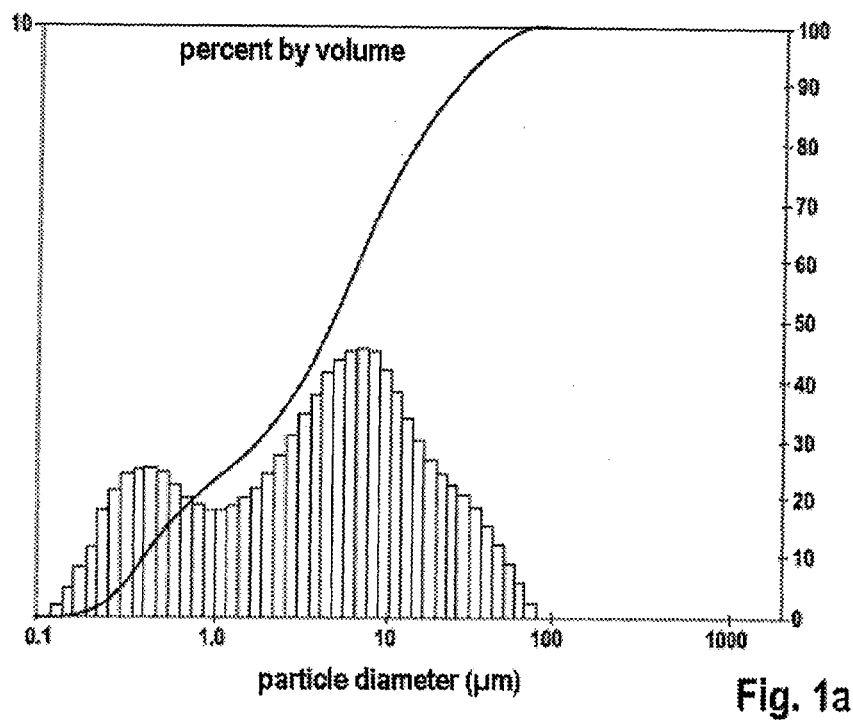
FIG. 1a: an SEM micrograph of barium sulphate particles which were precipitated at 40° C.
Figure 1B:
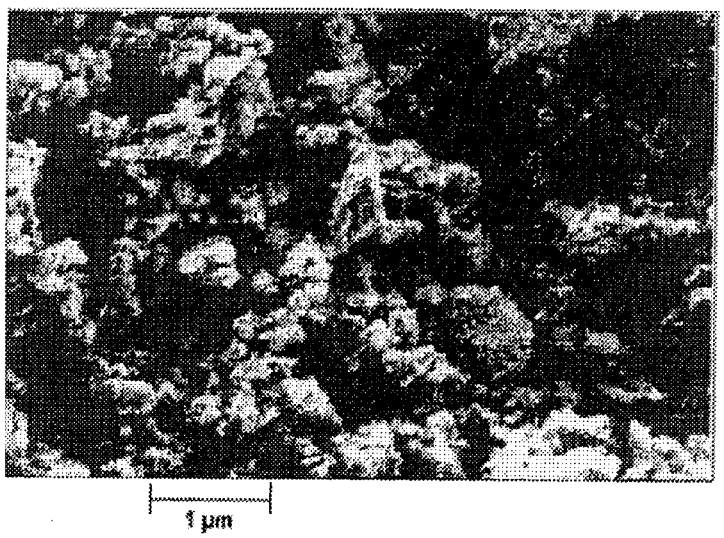
FIG. 1b: the particle-size distributions of the filter cake.

The procedure was as in comparison example 1, but the solution was heated to 40° with the heating plate before the addition of the barium hydroxide. The particle-size distribution of the still-wet filter cake shown in FIG. 1b is bimodal with $D_{10}$=0.4 μm, $D_{50}$=4.7 μm, $D_{90}$=24 μm. The X-ray diffraction spectrum of the dried and ground filter cake showed no phase-pure barium sulphate. The scanning electron microscope micrograph in FIG. 1a shows strongly agglomerated, irregularly shaped fine particles.

EXAMPLE 1

Precipitation of $BaSO_4$ at 80° C.

Figure 2A:
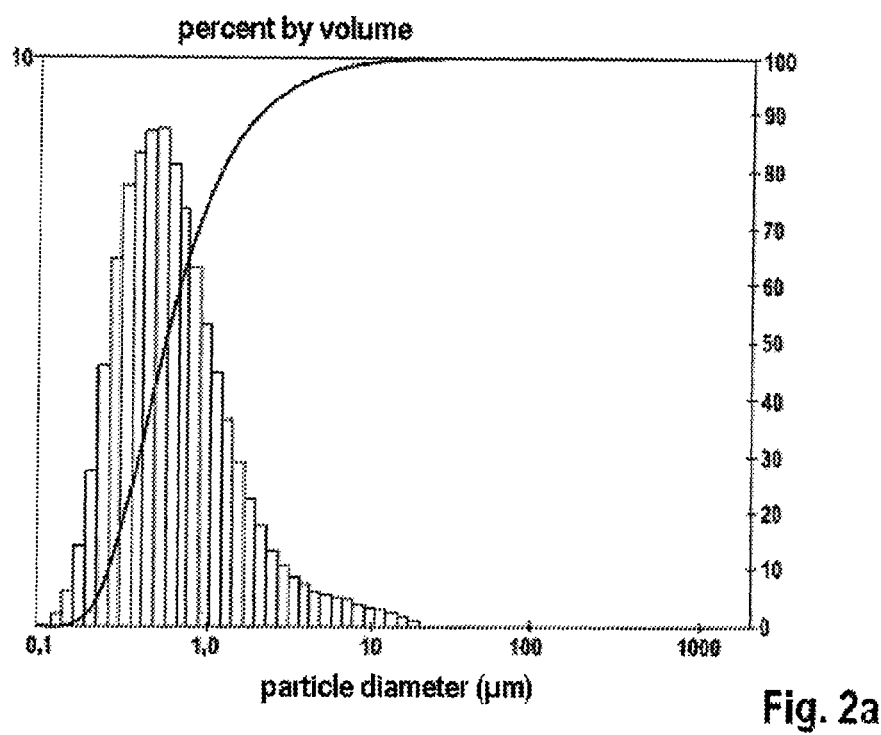
FIG. 2a: an SEM micrograph of the barium sulphate precipitated at a temperature of 80° C.
Figure 2B:
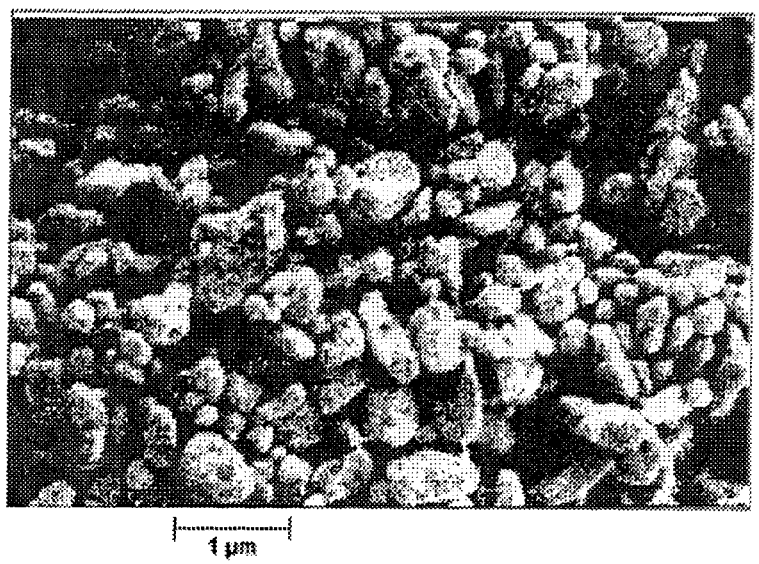
FIG. 2b: a diagram of the particle-size distribution of the product.

The procedure was analogous to that of comparison example 1, but the solution was heated to 80° with the heating plate before the addition of the barium hydroxide. The particle-size distribution of the still-wet filter cake shown in FIG. 2b is monomodal with $D_{10}$=0.3 μm, $D_{50}$=0.6 μm, $D_{90}$=1.9 μm. The X-ray diffraction spectrum of the dried and ground filter cake showed only one phase-pure barium sulphate. The scanning electron microscope micrograph in FIG. 2a shows well separated, relatively smooth roundish particles. The specific surface according to BET (DIN 66131) of the product was 10 m²/g. The brightness according to R457 is 97.2 and the yellow index 1.02.

In the control test described above test tube A shows slight clouding and test tube B no clouding. The composition, determined by ICP analysis, of the lithium hydroxide solution was:

| | |
|---|---|
| $Li^+$ | 18.1 g/l |
| $SO_4^{2-}$ | 132 mg/l |
| $PO_4^{3-}$ | 10 mg/l |
| $Fe^{2+}$ | 1 mg/l |
| $Ba^{2+}$ | 0.2 mg/l |

It is thus extremely suitable as starting raw material for a wet-chemical synthesis of lithium transition-metal mixed phosphates.

The invention claimed is:

1. A cyclic process for the preparation of barium sulphate and lithium transition-metal phosphates, comprising:
   (i) preparing an aqueous solution containing lithium and sulphate ions; and
   (ii) adding solid barium hydroxide at a temperature of more than 50° C.,
   wherein the barium hydroxide is added over a period of less than 15 minutes forming barium sulfate and lithium hydroxide in the solution.

2. The process of claim 1, carried out in the absence of seed crystals.

3. The process of claim 2, wherein the solid barium hydroxide is added in less than 5 minutes.

4. The process of claim 3, wherein the solution is stirred during and after the addition of solid barium hydroxide.

5. The process of claim 4, wherein the resultant barium sulphate is separated from the solution.

6. The process of claim 5, wherein the lithium hydroxide-containing solution is mixed with an acid solution containing phosphoric acid and at least one transition-metal sulphate.

7. The process of claim 1, wherein the aqueous solution containing lithium and sulphate ions from step i) is pretreated before carrying out step ii) by adding lithium hydroxide and setting a pH of more than 10 and wherein the resultant precipitate is separated.

8. The process of claim 7, wherein the separated precipitate is used as starting material for the preparation of lithium-metal phosphates.

9. The process of claim 8, wherein the separated precipitate is converted into easily soluble lithium hydrogen phosphate by acidification.

10. The process of claim 7, wherein the pretreated solution containing lithium sulphate is passed to a concentration phase by reverse osmosis.

11. The process of claim 10, wherein before the reverse osmosis the pretreated solution containing lithium sulphate is neutralized by the addition of sulphuric acid, or slightly acidified to a pH between 7 and 2.

12. Barium sulphate, obtained by the process of claim 1, with an average particle size in the range from 0.5 to 1 μm.

13. Barium sulphate according to claim 12, having a monomodal particle distribution with a $D_{50}$ value of 0.6 μm.

14. Barium sulphate according to claim 13, wherein it is chloride- and/or sulphide-free.

15. Barium sulphate according to claim 13, wherein it is alkali-free.

16. Barium sulphate according to claim 12, having a brightness of greater than 95.

\* \* \* \* \*